United States Patent

Buongiorno et al.

[11] Patent Number: 6,106,934
[45] Date of Patent: Aug. 22, 2000

[54] MULTILAYERED, BIORIENTED, HEAT SHRINKABLE FILM, METHOD FOR THE MANUFACTURE THEREOF AND USE THEREOF FOR PACKAGING FOOD PRODUCTS AND CONSUMER GOODS

[75] Inventors: Livio Buongiorno, Milan, Italy; Ray E. Patrick, Pelzer, S.C.; Luca Cerani, Milan, Italy; Paolo Ciocca, Novara, Italy; Roberto Forloni, Milan, Italy

[73] Assignee: Cryovac, Inc., Duncan, S.C.

[21] Appl. No.: 08/646,366
[22] PCT Filed: Oct. 28, 1994
[86] PCT No.: PCT/EP94/03589
  § 371 Date: Aug. 2, 1996
  § 102(e) Date: Aug. 2, 1996
[87] PCT Pub. No.: WO95/13187
  PCT Pub. Date: May 18, 1995

[30] Foreign Application Priority Data

Nov. 8, 1993 [IT] Italy .................. MI93A2370

[51] Int. Cl.[7] ........................................ B32B 27/32
[52] U.S. Cl. ............ 428/213; 428/34.9; 428/367; 428/520; 428/516; 428/518; 428/910
[58] Field of Search ................... 428/516, 500, 428/910, 515, 35.4, 34.9, 213, 526, 518; 264/290.2

[56] References Cited

U.S. PATENT DOCUMENTS

| | | |
|---|---|---|
| 3,148,409 | 9/1964 | Spencer ............................ 18/1 |
| 3,201,826 | 8/1965 | Bruckner .......................... 18/1 |
| 4,514,465 | 4/1985 | Schoenberg .................. 428/339 |
| 4,532,189 | 7/1985 | Mueller ....................... 428/516 |
| 4,551,380 | 11/1985 | Schoenberg .................. 428/218 |
| 4,597,920 | 7/1986 | Golike ........................... 264/22 |
| 4,841,605 | 6/1989 | Schuierer ......................... 26/74 |
| 5,241,030 | 8/1993 | Barry et al. .................. 428/332 |
| 5,332,616 | 7/1994 | Patrick et al. ................ 428/218 |
| 5,482,771 | 1/1996 | Shah .......................... 428/349 |
| 5,589,561 | 12/1996 | Barry et al. ................ 526/348.1 |
| 5,677,383 | 10/1997 | Chum et al. .................. 525/240 |

FOREIGN PATENT DOCUMENTS

| | | |
|---|---|---|
| 0169640 | 1/1985 | European Pat. Off. . |
| 0405916 | 6/1990 | European Pat. Off. . |
| 0450088 | 10/1990 | European Pat. Off. . |
| 0 319 401 B1 | 10/1993 | European Pat. Off. . |
| 2097324 | 11/1982 | United Kingdom . |

Primary Examiner—Paul Thibodeau
Assistant Examiner—D. Lawrence Tarazano
Attorney, Agent, or Firm—Mark B. Quatt

[57] ABSTRACT

A multilayer, biaxially oriented, heat shrinkable thermoplastic film includes a layer having between 50 and 100 parts by weight ethylene/alpha-olefin $C_4$–$C_{12}$ copolymer, and between 0 and 50 parts by weight of a polymer selected from polyolefin, and modified polyolefin, the layer having more than one melting point when detected by diffential scanning calorimetry according to ASTM D-3418; wherein the total thickness variation in the multilayer film is lower than ±10%, and wherein the average deviation of the multilayer film from a straight line is lower than ±40 mm, and wherein the sag average of the multilayer film is lower than 25 mm. A method of making the film, and a package made with the film, are also disclosed.

13 Claims, 2 Drawing Sheets

MULTILAYERED, BIORIENTED, HEAT SHRINKABLE FILM, METHOD FOR THE MANUFACTURE THEREOF AND USE THEREOF FOR PACKAGING FOOD PRODUCTS AND CONSUMER GOODS

FIELD OF THE INVENTION

The present invention relates to a multilayer, bioriented, heat shrinkable film, a method for the manufacture thereof and use thereof for packaging food products and consumer articles.

More particularly, the present invention relates to a multilayer, bioriented, heat shrinkable film extruded from a flat die and stretched both in machine direction and in cross-direction wherein at least one layer comprises at least one ethylene/alpha-olefin $C_4$–$C_{12}$ copolymer.

BACKGROUND OF THE INVENTION

Multilayer heat shrinkable films have been known for a long time.

U.S. Pat. No. 4,532,189 (W.R. Grace & Co.) discloses a multilayer, heat shrinkable film comprising:
  (A) a core (central) layer comprising a linear low density polyethylene or a linear medium density polyethylene;
  (B) two skin (external) layers comprising a blend of from 70% to 90%, by weight, of an ethylene/propylene copolymer and from 10% to 30%, by weight, of a propylene homopolymer;
wherein said film has an average machine direction free shrink at 200° F. of at least 12% and an average cross-direction free shrink at 200° F. of at least 17%.

The core layer may also comprise other polymers such as, for example, ethylene/propylene copolymers, ethylene/vinyl acetate copolymers, ionomer resins and non-linear low density poly ethylenes.

Moreover, said film may also comprise two intermediate layers comprising a blend of approximately 90% by weight of an ethylene/vinyl acetate copolymer and approximately 10% of an ionomer resin.

U.S. Pat. No. 4,551,380 (W.R. Grace & Co.) discloses a multilayer heat shrinkable film comprising:
  (A) a cross-linked core layer consisting essentially of a linear low density polyethylene; and
  (B) two surface layers comprising essentially a blend of (1) a linear low density polyethylene, (2) a linear medium density polyethylene and (3) an ethylene/vinyl acetate copolymer.

GB-A-2,097,324 discloses heat shrinkable films manufactured by stretching, at least three times their original linear dimension in at least one direction, a film having the following homogeneous composition:
  (A) 5–100%, by weight, of at least one linear copolymer of ethylene with at least one $C_8$–$C_{18}$ alpha-olefin, said copolymer having the following characteristics:
    (a) melt index of 0.1–4.0 g/10 min.;
    (b) density of 0.900–0.940 g/cm$^3$;
    (c) stress exponent above 1.3; and
    (d) two distinct crystallite melting regions below 128° C. as determined by differential scanning calorimetry (DSC), the temperature difference between said regions being at least 15° C.; and
  (B) 0–95%, by weight, of at least one polymer selected from the group consisting of ethylene homopolymers and copolymers of ethylene with an ethylenically unsaturated comonomers, said polymer having only one crystallite melting point below 128° C.;
with the proviso that stretching is carried out within the temperature range defined by the two melting points of the crystallites of the ethylene/alpha-olefin copolymer of the above paragraph (A).

These films are manufactured by the well-known air bubble technique. An example of method and equipment of this technique is disclosed by U.S. Pat. No. 4,841,605.

However, the films obtained with this technique have the disadvantage of not having sufficiently uniform thickness and planarity. In fact the total thickness variation in said films is ±15% while, as regards planarity, it has defects consisting of deviations from a straight line (snaking) and sags. More particularly the average deviations from a straight line (snaking) is approximately 50 mm, whereas the average sag is approximately 35 mm.

In addition to the air bubble technique, stretching the films also by the so-called "tenter frame" technique is known. Examples of machines suitable for implementing this technique are disclosed by U.S. Pat. Nos. 3,148,409 and 3,201,826.

The tenter frame technique, also known as "flat orientation technology", consists of extruding a film-forming material through a flat die over a chill roll, preferably immersed in water, to chill the molten film.

In the case of multilayer films the various polymers or blends of polymers are generally coextruded by conventional techniques but, when only a few of the layers have to undergo special treatments, such as for example irradiation with fast electrons to induce cross-linking, only the layer or layers to be treated is extruded or are coextruded, the tape obtained in this way is subjected to the required treatment and then the remaining layers are extruded on the same.

The tape is then oriented, by stretching, in two separate and successive steps, although devices able to stretch the tape simultaneously in both directions are known (U.S. Pat. No. 3,148,409).

Generally stretching is performed first in machine direction (MD) and then in cross-direction (TD).

MD stretching is usually carried out by passing the tape through pairs of rolls which rotate at different speeds. At least one of the first pairs of rolls is heated, for example by inner circulation of hot oil.

TD stretching is usually performed in a tenter frame oven which comprises a certain number of heating zones and suitable stretching means.

Typically a tenter frame oven comprises from three to six zones: one to two for preheating the tape, one to two for stretching it in the cross-direction and one to two for relaxing and winding the film. Each zone may be heated at a different temperature level.

This technique has not however been adopted in the manufacture of heat shrinkable films based on ethylene copolymers.

Only EP-A-405 916 discloses the utilization of this technique in the manufacture of an extruded, bioriented, mono or multilayer film, wherein the film-forming polymers of at least one layer consist of:
  (A) 75–100%, by weight, of at least one linear ethylene/alpha-olefin copolymer having a density of between 0.890 g/cm$^3$ and 0.930 g/cm$^3$, and
  (B) 25–0%, by weight, of a linear high density polyethylene having a density of between 0.935 and 0.960 g/cm$^3$, with the proviso that the total of the film-forming polymer (A) and (B) has a single melting point as determined by differential scanning calorimetry according to ASTM D-3417.

Moreover, EP-A-405 916, page 3, lines 18–21, reports that attempts made to apply the tenter frame technique to the polymers of GB-A-2 097 324 have not given satisfactory results because the films obtained in this way were highly sensitive to minimal variations of the process parameters, such as stretching temperature, stretching ratio and the speed of the manufacturing line.

Although EP-A-405 916 also refers to multilayer films, its examples only refer to monolayer films.

On the other hand, multilayer films have, compared to monolayer ones, the considerable advantage of allowing to combine one with the other several layers having different physical and chemical properties in view of the required properties of the final film.

Therefore the need for heat shrinkable multilayer films, extruded from a flat die, bioriented by the tenter frame technique, wherein at least one layer comprises ethylene copolymers, is still greatly felt.

In fact, the films manufactured by this technique have several advantages over those manufactured by the air bubble technique.

A first advantage consists of the fact that the stretching ratios in machine direction and cross-direction may vary as required whereas in the air bubble technique they are always substantially equal one to the other.

A second advantage is that the stretching ratio may be preselected within a relatively wide range, typically of betweeen 2:1 and 12:1, while in the air bubble technique it must be between 3:1 and 6:1.

A third advantage is that the sealing agents can be selected as required whereas in the air bubble technique they have to be selected in the restricted range of sealants whose softening point is not substantially lower than the stretching temperature to prevent the sealant from softening during the heating step, with consequent sealing of the opposite walls of the bubble.

A further advantage consists of the fact that the thickness and planarity of the films manufactured by this technique are much more uniform than in those manufactured with the air bubble technique.

An additional advantage is that, being able to control the thickness better, thinner films can be manufactured, consequently saving materials and reducing environmental impact.

OBJECTS OF THE INVENTION

In accordance with the above, a first object of the present invention is to provide a multilayer heat shrinkable film, extruded from a flat die and bioriented by the tenter frame technique, wherein at least one layer consists of at least 50%, by weight, of an ethylene/alpha-olefin $C_4$–$C_{12}$ copolymer or of a blend of ethylene/alpha-olefin $C_4$–$C_{12}$ copolymers.

A second object of this invention is to provide a multilayer heat shrinkable film wherein the total variation in thickness is lower than ±10% and, preferably, than ±5%.

A third object of this invention is to provide a multilayer heat shrinkable film wherein the average of the deviations from a straight line (snaking) is lower than 40 and, preferably, than 25 mm, and average of the sags is lower than 25 mm.

A fourth object of this invention is to provide a multilayer heat shrinkable film which has been stretched with a stretching ratio of from 2:1 to 11:1 in machine direction and from 3:1 to 12:1 in cross-direction and, preferably, with a stretching ratio of from 4.5:1 to 9.5:1 in machine direction and from 5:1 to 11:1 in cross-direction.

Another object of this invention is to provide a method for the manufacture of a multilayer heat shrinkable film having the above characteristics.

A further object of this invention is to provide the use of a multilayer heat shrinkable film having the above characteristics to package food products and consumer articles.

These and other objects have been achieved by the film described hereinbelow.

DEFINITIONS

Unless otherwise stated, in this description and in the claims, the following symbols have the meanings set forth hereinbelow.

A. Extrusion $S_e$=linear speed (m/min.) of the quenched cast flat tape $T_c$=chill roll temperature.

B. Longitudinal orientation $L_r$=longitudinal stretching ratio $T_p$=rolls temperature (°C.) before longitudinal orientation (preheating)

$T_l$=rolls temperature (°C.) during longitudinal orientation

MD=machine or longitudinal direction

C. Cross-direction orientation $C_r$=cross-direction stretching ratio $T_{cp}$=preheating temperature (°C.) in the cross-direction $T_{cs}$=stretching temperature (°C.) in the cross-direction $T_{cr}$=relaxation temperature (°C.) in the direction $S_c$=winding speed TD=cross-direction D. Properties of the films ST=shrink tension This property is measured by gradually heating the film and measuring the maximum force developed per section unit of the film itself.

S %=shrink percentage

This property is measured by heating the film at 120° C. for at least 5 sec., and then measuring the percentage of shrinkage in the longitudinal direction and in the cross-direction.

H=haze

This property is measured according to ASTM D 1003-61.

G=Gloss

This property is measured according to ASTM D 2457-90.

M=elastic modulus

This property is measured according to ASTM D 882-90.

TS=tensile strength

This property is measured according to ASTM D 882-90.

E=elongation

This property is measured according to ASTM D 882-90.

TTV=total thickness variation

This property is measured according to ASTM D 374-88.

PTV=planarity variation

The main planarity defects consist of bag & sag and snaking.

The device used to measure these defects essentially consists of 1. an unwind section with locking devices,
2. a dancing rolls to allow proper tension adjustment,
3. two idle rolls spaced circa 4 meters one from the other to support the film span under measurement,
4. a reference scale for proper film alignment close to each idle roll,
5. a pair of rubber clamps actuated by a pedal lever to block the film side opposite to the unwind section,
6. a motorised rewind section,
7. a device for measuring the length of the rewound film between two sets of measurement, 8. a guide, positioned substantially at the center between the two idle rolls, which supports:
   a) a feeler fixed to a sliding support unit provided with a scale for measuring the horizontal distance covered by the feeler from a prefixed zero point corresponding to the left edge of the film and a second scale for measuring vertical movements. The zero on this scale has been fixed by taking into consideration the natural drop midway in a perfectly flat film span,
   b) a slide fixed at the zero reference point,
9. various couples of weights to be attached to the dancing roller to adjust the tension of the film according to the type, width and thickness of the film itself.

In order to perform the measurements, a roll of film is placed in the unwind section and a length of film is unwound.

The unwind station is locked.

The film is aligned and fixed to the wind-up core.

The rewind section is locked.

Using the vertical scale, the position of the flattest part of the film is measured.

The bag and sag in the film are then measured by recording the difference between the film levels at each point and the level of the flattest part of the film.

Measurements are taken along the whole film width from the left to the right side so as to obtain a representative profile of the surface. For this purpose measurements every 5–10 cm are recommended.

The data are reported on paper, i.e. sag and relevant position (left, center or right).

The whole operation is performed twice to four times to measure from two to four lengths of film.

Snaking, also referred to as "banana effect", represents the deviation of film from a straight line for a given length of material.

The measurements are performed on a length of film of 4 meters using the device and method described above.

Cross-linking is measured according to ASTM D 2765-90.

The term Mrad denotes the dose absorbed by the tape or by the film during treatment of irradiation with high energy electrons, and is equivalent to $10^4$ J/Kg.

Moreover, unless otherwise stated in this description and in the claims, the following terms have the meanings indicated hereinbelow.

The term "film" means a flat and flexible material having a thickness of between 5 and 150 microns.

The term "heat shrinkable film" means a bioriented film which shrinks by at least 15% at 120° C. in both directions.

The term "tape" means a layer of material before orientation and has typically a thickness of between 180 microns and 3 mm.

The term "polyolefin" means thermoplastic resins obtained by homopolymerisation or copolymerisation of olefins with other monomers, wherein the olefin units are present in larger amounts than other monomers. The term "polyolefin" comprises but is not limited to "ethylene/alpha-olefin copolymer", "ethylene/vinyl acetate (EVA) copolymer", "ethylene/acrylate copolymer", "propylene copolymer" and "polypropylene" (PP) as defined hereinafter.

The term "modified polyolefins" means polyolefins characterised by the presence of functional groups, such as anhydride and/or carboxyl acid groups.

The term "ethylene/alpha-olefin copolymer" means a copolymer of ethylene and one or more $C_4$–$C_{12}$ alpha-olefins and is preferably selected from the group comprising linear copolymers of ethylene and butene-1, 4-methyl-pentene-1, hexene-1 or octene-1.

The term "ethylene/vinyl acetate (EVA) copolymer" means an ethylene/vinyl acetate copolymer wherein the ethylene units are present in larger amounts than the vinyl acetate units.

The term "ethylene/acrylate copolymer" means a compound obtained by copolymerisation, according to known techniques, of ethylene with acrylic monomers of the formula

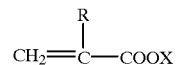

where R is H or $C_1$–$C_4$ alkyl, and
X is H, $C_1$–$C_4$ alkyl or a metal cation, preferably chosen from Zn++ and Na+,
wherein the ethylene units are present in larger amounts than the acrylic units.

The term "propylene copolymer" means a copolymer of propylene and ethylene and/or butene-1 wherein the propylene units are present in larger amounts than the ethylene or butene units.

The term "polypropylene" (PP) means a thermoplastic resin obtained by homopolymerisation of propylene according to conventional techniques.

SUMMARY OF THE INVENTION

It has now been found that the abovementioned objects are achieved with a multilayer, bioriented, heat shrinkable film extruded from a flat die wherein at least one layer comprises an ethylene/alpha-olefin $C_4$–$C_{12}$ copolymer, characterised in that said layer comprises $A_1$) 50–100 parts, by weight, of an ethylene/alpha-olefin $C_4$–$C_{12}$ copolymer or a blend of ethylene/alpha-olefin $C_4$–$C_{12}$ copolymers, and $A_2$) 50–0 parts, by weight, of a polymer selected from polyolefins, modified polyolefins and blends thereof, with the proviso that this layer has more than one melting point as determined by differential scanning calorimetry according to ASTM D-3418.

The present invention relates therefore to a multilayer, bioriented, heat shrinkable film extruded from a flat die wherein at least one layer comprises an ethylene/alpha-olefin $C_4$–$C_{12}$ copolymer, characterised in that:

(a) said layer comprises $A_1$) 50–100 parts by weight of an ethylene/alpha-olefin $C_4$–$C_{12}$ copolymer or a blend of ethylene/alpha-olefin $C_4$–$C_{12}$ copolymers, and $A_2$) 50–0 parts by weight of a polymer chosen from among polyolefins, modified polyolefins and blends thereof, with the proviso that this layer has more than one melting point as determined by differential scanning calorimetry according to ASTM D-3418, (b) the total variation in thickness of said film is lower than ±10%, and (c) the average deviation from a straight line (snaking) of said film is less than 40 mm.

(d) the average sag is smaller than 25 mm.

The polyolefins are preferably selected from ethylene/vinyl acetate copolymers, ethylene/acrylate copolymers, propylene copolymers and polypropylenes.

The melting behaviour of ethylene/alpha-olefin $C_4$–$C_{12}$ copolymers depends on many factors related to the copolymerisation process: quantity of the alpha-olefin, nature of the catalyst, comonomer feed rate, temperature and other process conditions which may have a significant effect on the distribution of the alpha-olefin in the copolymer chains.

Examples of suitable alpha-olefins are butene-1, 4-methylpentene-1, hexene-1 and octene-1.

According to the present invention, the content of alpha-olefin in the ethylene/alpha-olefin $C_4$–$C_{12}$ copolymer is preferably of at least 7%, by weight, and the alpha-olefin is octene-1.

Even more preferably the ethylene/alpha-olefin $C_4$–$C_{12}$ copolymer is a linear ethylene/octene-1 copolymer which has a octene-1 content of 10% ±2%, by weight, a density of circa 0.920 g/cm$^3$ and three melting points at 106 ±2; 119 ±2 and 122 ±2° C.

Advantageously the layers comprising an ethylene/alpha-olefin $C_4$–$C_{12}$ copolymer are the core layer of a film having three layers or the skin layers of a film having five layers.

The two skin layers of a three-layer film and the intermediate layers of a five-layer film may have a composition which is different one from the other. Nevertheless, they preferably have the same composition and essentially consist of one or more film-forming polymers chosen from among ethylene/vinyl acetate copolymers, ethylene/acrylate copolymers, polypropylene, polypropylene copolymers, modified polyolefins and blends thereof.

The method for manufacturing a multilayer, bioriented, heat shrinkable film according to the present invention comprises, preferably, stretching of the film, at appropriate temperatures, first in machine direction and then in cross-direction.

The use of multilayer, bioriented, heat shrinkable film according to the present invention for packaging articles is of the conventional type: the film is wound around the article, sealed or clipped and shrunk.

DESCRIPTION OF THE PREFERRED EMBODIMENTS

Figure 1:
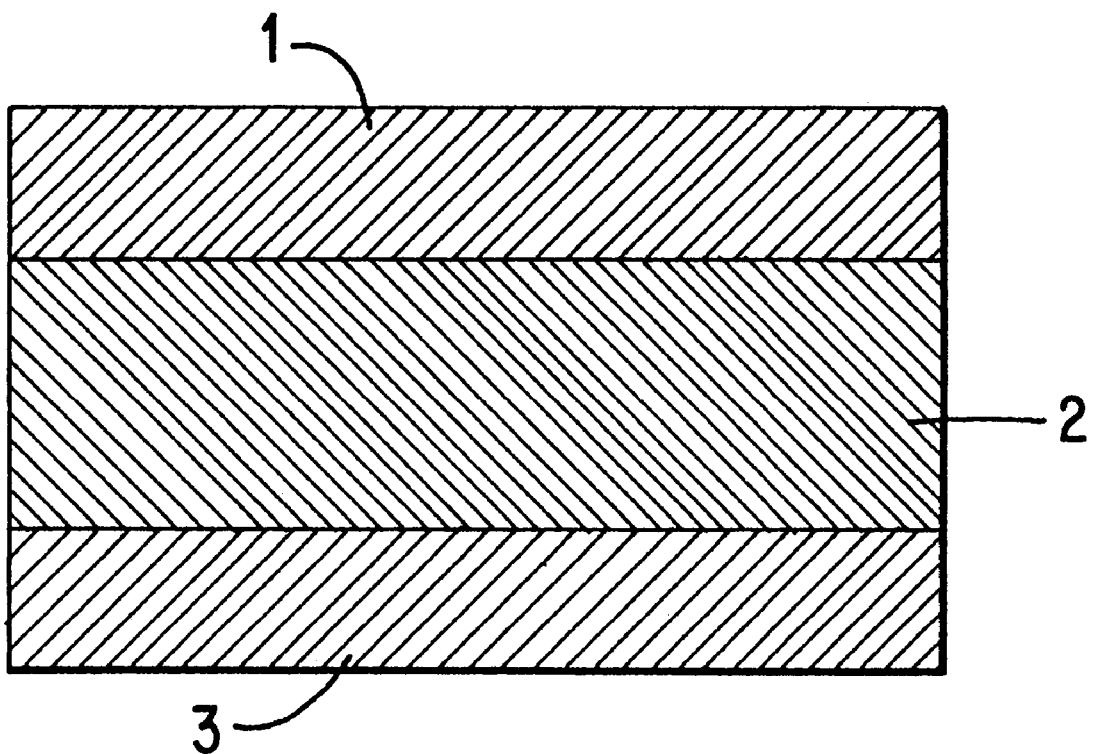
FIG. 1 is a cross section of a first preferred embodiment according to the present invention consisting of a three-layer bioriented film.

Referring to FIG. 1, which is a cross section of a preferred bioriented, three-layer film according to the present invention, it can be seen that this embodiment comprises a core layer 2 and two skin layers 1 and 3.

Preferably, the thickness of the film is of from 8 to 25 microns. The preferred thickness of the core or internal layer is in the range of from 1 to 23 microns whereas that of each of the skin (external) layers is in the range of from 1 to 12 microns.

The core layer comprises
- $A_{1)}$ 50–100 parts, by weight, of an ethylene/alpha-olefin $C_4$–$C_{12}$ copolymer or a blend of ethylene/alpha-olefin $C_4$–$C_{12}$ copolymers, and
- $A_{2)}$ 50–0 parts, by weight, of a copolymer chosen from among ethylene/vinyl acetate copolymers, ethylene/acrylate copolymers, polypropylenes, polypropylene copolymers, modified polyolefins and blends thereof, with the proviso that this layer has more than one melting point as determined by differential scanning calorimetry according to ASTM D-3418.

Typically, the core layer comprises 100%, by weight, of an ethylene/alpha-olefin $C_4$–$C_{12}$ copolymer or a blend of ethylene/alpha-olefin $C_4$–$C_{12}$ copolymers which have more than one melting point as determined by differential scanning calorimetry according to ASTM D-3418.

A typical example of film-forming composition suitable for forming the layer 2 of FIG. 1 consists of 100% of an ethylene/octene-1 copolymer which contains 10% of octene-1 and as a density of 0.920 g/cm$^3$ and three melting points at 106 ±2; 119 ±2 and 122 ±2° C.

When manufacturing a first preferred embodiment of FIG. 1, it may however be advantageous to recycle the remains of film-forming composition and scraps, of tape and/or film which are generated during the various steps of the manufacturing process, adding them to the film-forming composition of the core layer. In this case, the film-forming composition of the core layer will contain up to 25%, by weight, of a polymer chosen from polyolefins, modified polyolefins and blends thereof.

Preferably, both the skin layers 1 and 3 of FIG. 1 have the same composition and essentially consist of a polymer chosen from ethylene/vinyl acetate copolymers, ethylene/acrylate copolymers, polypropylenes, polypropylene copolymers, modified polyolefins and blends thereof.

Examples of preferred polyolefins for these layers are ethylene/alpha-olefin $C_4$–$C_{12}$ copolymers, propylene copolymers and polypropylenes.

A first typical example of a suitable film-forming composition for both layers 1 and 3 of FIG. 1 is the following:
- 40–60%, by weight, of a first ethylene/alpha-olefin $C_4$–$C_{12}$ copolymer,
- 20–30%, by weight, of a second ethylene/alpha-olefin $C_4$–$C_{12}$ copolymer,
- 20–30% by weight of an ethylene/vinyl acetate copolymer (EVA).

A second typical example of film-forming composition suitable for both layers 1 and 3 of FIG. 1 is the following:
- 75–100%, by weight, of a copolymer of propylene,
- 0–25%, by weight, of a polypropylene (PP).

Figure 2:
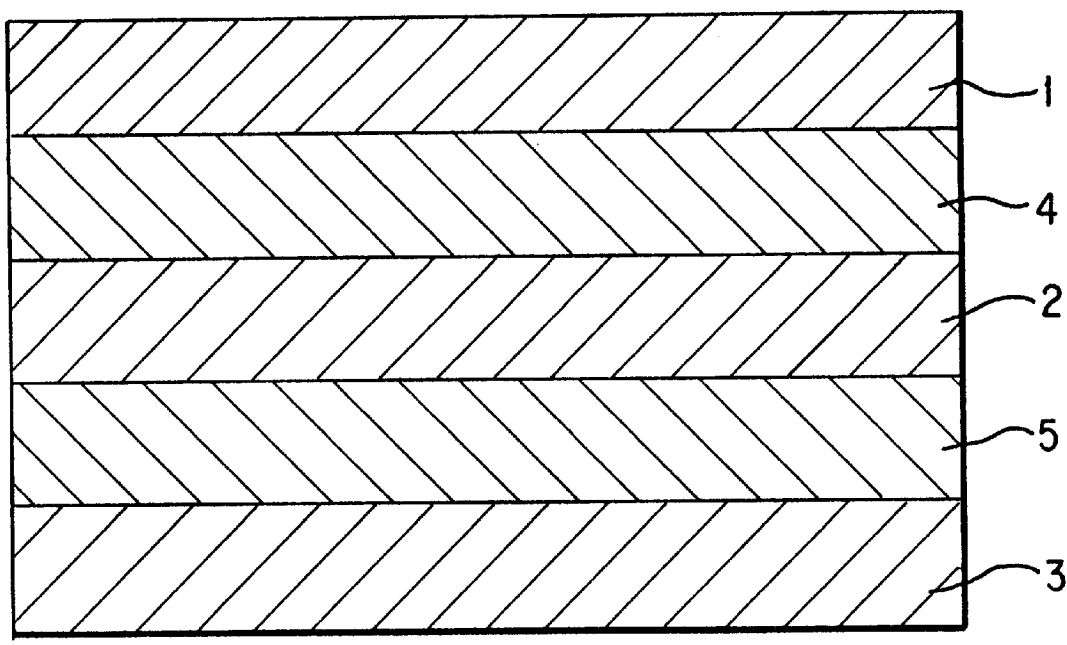
FIG. 2 is a cross section a second preferred embodiment according to the present invention consisting of a five-layer bioriented film.

The second preferred embodiment shown in FIG. 2 relates to a five-ply barrier film of this invention comprising a core layer 2, two tie (or intermediate) layers 4 and 5, and two skin layers 1 and 3.

Preferably, the thickness of this film is of from 15 to 45 microns.

The core layer 2 of the embodiment shown in FIG. 2 acts as a barrier against oxygen permeation and is made of any of the known barrier polymeric resins, such as ethylene/vinyl alcohol copolymers (EVOH) and vinylidene chloride copolimers (PVDC). The term EVOH refers to saponified products of ethylene/vinyl ester copolymers, generally of ethylene-vinyl acetate copolymers, wherein the ethylene content is typically comprised between 20 and 60% by mole and the degree of saponification is generally comprised between 85 and 99.5%. The EVOH can be employed as such or blended with other EVOHs or with one or more polyamides. The term PVDC refers to a vinylidene chloride copolymer wherein a major amount of the copolymer comprises vynilidene chloride and a minor amount of the copolymer comprises one or more unsaturated monomers copolymerizable therewith, typically vinyl chloride, and alkyl acrilates (e.g. metyl acrylate) or to a blend thereof in different proportions. Generally said PVDC will contain plasticisers and/or stabilizers as known in the art.

The composition of the two tie layers 4 and 5 of the embodiment shown in FIG. 2 may be the same or different. Advantageously the tie layers 4 and 5 have the same composition and are made of a modified polyolefin.

A typical example of film-forming composition suitable for forming the layers 4 and 5 of FIG. 2 consists of 100% of a maleic anhydride grafted ethylene/butene copolymer containing 6% by weight of butene.

Preferably both skin layers 1 and 3 of the embodiment shown in FIG. 2 have the same composition and comprise $A_{1)}$ 50–100 parts, by weight, of an ethylene/alpha-olefin $C_4$–$C_{12}$ copolymer or a blend of ethylene/alpha-olefin $C_4$–$C_{12}$ copolymers, and $A_{2)}$ 50–0 parts, by weight, of a copolymer chosen from among polyolefins, modified polyolefins and blends thereof, with the proviso that at least one of these layers has more than one melting point as determined by differential scanning calorimetry according to ASTM D-3418.

Typically, the skin layers 1 and 3 of the second preferred embodiment of FIG. 2 comprise 100%, by weight, of an ethylene/alpha-olefin $C_4$–$C_{12}$ copolymer or a blend of ethylene/alpha-olefin $C_4$–$C_{12}$ copolymers which have more than one melting point as determined by differential scanning calorimetry according to ASTM D-3418.

A typical example of a film-forming composition suitable for forming the layers 1 and 3 of FIG. 2 consists of 100% of an ethylene/octene-1 copolymer which contains 10% of octene-1 and has a density of 0.920 g/cm$^3$ and three melting points at 106 ±2; 119 ±2 and 122 ±2° C.

When manufacturing a second preferred embodiment according to FIG. 2, it may be advantageous to recycle the remains of film-forming composition and scraps, of tape and/or film, which are generated during the various steps of the manufacturing process, adding them to the film-forming composition for the skin layers 1 and 3 or, preferably, for the intermediate layers 4 and 5. Alternatively, and preferably in this case, additional inner layer(s) can be formed composed exclusively of recycled film. In any case the film will contain up to from 30% to 40% by weight, preferably up to 25%, even most preferably from about 7% to about 20% of recycled material.

A first specific example of composition suitable for manufacturing a multilayer, bioriented, heat shrinkable film according to the present invention is the following:

Film-forming composition of the core layer 2 (FIG. 1):

100% of an ethylene/octene-1 copolymer which contains 10% octene-1 (NMR determination) and has a density of 0.920 g/cm$^3$ and three melting points at 106 ±2; 119 ±2 and 122 ±2° C.

Film-forming composition of the skin layers 1 and 3 (FIG. 1):

50.1%, by weight, of an ethylene/octene-1 copolymer which contains 10% of octene-1 (NMR determination) and has a density of 0.920 g/cm$^3$ and three melting points at 106 ±2; 119 ±2 and 122 ±2° C.;

24.8%, by weight, of an ethylene/octene-1 copolymer which contains 3.8% of octene-1 (NMR determination) and has a density of 0.926 g/cm$^3$ and a single melting point at 122.5 ±2° C.;

24.6%, by weight, of an ethylene/vinyl acetate copolymer which contains 4.5% of vinyl acetate and has a density of 0.926 g/cm$^3$ and a single melting point at 106.8 ±2° C.;

0.5% of slip and anti-block agents.

It will be noted that not only the core layer but also the skin layers have more than one melting point and come within the scope of the present invention also as regards their composition.

A second specific example is the following:

Film-forming composition of the core layer 2 (FIG. 1):

100% of an ethylene/octene-1 copolymer which contains 10% of octene-1 (NMR determination) and has a density of 0.920 g/cm$^3$ and three melting points at 106 ±2; 119 ±2 and 122 ±2° C.

Film-forming composition of the skin layers 1 and 3 (FIG. 1):

87.5%, by weight, of a propylene/ethylene copolymer which contains 3.5% of ethylene and has a density of 0.900 g/cm$^3$ and a single melting point at 135.9° C.;

12.1%, by weight, of polypropylene having a density of 0.904 g/cm$^3$ and a single melting point at 160° C.;

0.4% of slip and anti-block agents.

A third specific example of composition suitable for manufacturing a multilayer, bioriented, heat shrinkable film according to the present invention is the following:

Film-forming composition of the core layer 2 (FIG. 2):

80% by weight of an etylene/vinyl alcohol copolymer containing 44% ethylene,

20% by weight of a caprolactam/laurolactam copolymer melting at 128–132° C.;

Film forming composition of the intermediate layers 4 and 5 (FIG. 2):

100% by weight of a maleic anhydride grafted ethylene/butene copolymer containing 6% by weight of butene;

Film-forming composition of the skin layers 1 and 3 (FIG. 2):

50.1%, by weight, of an ethylene/octene-1 copolymer which contains 10% of octene-1 (NMR determination) and has a density of 0.920 g/cm$^3$ and three melting points at 106 ±2; 119 ±2 and 122 ±2° C.;

24.8%, by weight, of an ethylene/octene-1 copolymer which contains 3.8% of octene-1 (NMR determination) and has a density of 0.926 g/cm$^3$ and a single melting point at 122.5 ±2° C.;

24.6%, by weight, of an ethylene/vinyl acetate copolymer which contains 4.5% of vinyl acetate and has a density of 0.926 g/cm$^3$ and a single melting point at 106.8 ±2° C.;

0.5% of slip and anti-block agents.

It will be noted that the skin layers 1 and 3 have more than one melting point and come within the scope of the present invention.

Examples of suitable slip agents are erucamide (available from Humko Chemical under the trademark Kemamide E). Other examples of suitable slip agents are stearamide (available from Humko Chemical under the trademark Kemamide S) and N,N'-dioleoylethylenediamine (available from Glyco Chemical under the trademark Acrawax C).

An example of a suitable anti-block agent is represented by diatomaceous silica (available from McCullough & Benton, Inc. under the trademark Superfine Superfloss). Other suitable anti-block agents are synthetic silicas such as those manufactured and sold by the Davison Division of WR Grace, under the trademark Syloid.

As is well-known to those skilled in the art, other suitable additives for film-forming compositions are antioxidants, heat stabilisers, organic or inorganic coloured pigments, anti-fog agents, anti-static agents, UV absorbers and the like.

These types of additives may be added to the film-forming compositions of the present invention according to criteria which are well-known to those skilled in the art, without however departing from the scope of the present invention.

In a typical embodiment of the present invention, the extruded and cooled tape is irradiated, before stretching, with high energy electrons. Said irradiation may however also be performed during or after stretching.

As is well-known to those skilled in the art, this type of irradiation causes cross-linking of the polymers and improves their mechanical properties, especially at high temperatures.

The preferred level of radiation is of from 1 to 12 Mrad.

Even more preferably the level of radiation is of from approximately 1.5 to approximately 5 Mrad.

The preferred conditions for orienting the multilayer films of the present invention comprise first of all stretching in machine direction at a temperature of from 60 to 150° C., preferably of from 80 to 120° C., and then stretching in cross-direction, preheating the film to a temperature of from 80 to 190° C., preferably of from 110 to 170° C., stretching it at a temperature of from 60 to 160° C., preferably of from 80 to 140° C., and, finally, relaxing it at a temperature of from 50 to 150° C., preferably of from 75 to 130° C.

Generally, the stretching ratios according to the invention range from 2:1 to 11:1 in machine direction and from 3:1 to 12:1 in cross-direction and, preferably, from 4.5:1 to 9.5:1 in machine direction and from 5:1 to 11:1 in cross-direction.

Unlike multilayer, bioriented, heat shrinkable films manufactured with the same composition but by the air bubble technique, the multilayer, bioriented, heat shrinkable film of the present invention is characterised by a total thickness variation lower than ±10%. Typically said total variation in thickness is lower than ±5%.

Moreover, the film according to the present invention is characterised in that the average deviation from a straight line (snaking) is smaller than 40 mm and that the average sag is smaller than 25 mm.

Typically, the average deviation from a straight line (snaking) is smaller than 25 mm.

The preferred use of the multilayer, bioriented, heat shrinkable film according to the present invention consists of packaging articles of various types. Preferably food products and consumer articles.

In practice, the film is wound around the article, sealed or clipped and shrunk according to conventional techniques. For example, by exposing the article wound in the film to a current of hot air or hot water.

The following examples are intended to illustrate the present invention without however limiting it in any way. The melting points set forth in the description, in the claims and in the following examples have been measured by differential scanning calorimetry according to ASTM D-3418.

EXAMPLES 1–5

Film-forming composition of the core layer 2 (FIG. 1):

100% of an ethylene/octene-1 copolymer which contains 10% of octene-1 (NMR determination) and has a density of 0.920 g/cm$^3$ and three melting points at 106 ±2; 119 ±2 and 122 ±2° C.

Film-forming composition of the skin layers 1 and 3 (FIG. 1):

50.1%, by weight, of an ethylene/octene-1 copolymer which contains 10% of octene-1 (NMR determination) and has a density of 0.920 g/cm$^3$ and three melting points at 106 ±2; 119 ±2 and 122 ±2° C.;

24.8%, by weight, of an ethylene/octene-1 copolymer which contains 3.8% of octene-1 (NMR determination) and has a density of 0.935 g/cm$^3$ and a single melting point at 122.5 ± 2° C.;

24.6%, by weight, of an ethylene/vinyl acetate copolymer which contains 4.5% of vinyl acetate and has a density of 0.926 g/cm$^3$ and a single melting point at 106.8 ±2° C.;

0.5% of slip and anti-block agents.

Note: the aforesaid blend of layers 1 and 3 has two melting points at 102.1 and 120.5 ±2° C.

Production was performed on Brueckner lines.

The film-forming compositions were coextruded through a flat die and the cast tape was chilled on a chill roll partially immersed in a water bath at a temperature of from 5 to 60° C. (T$_c$) with the aid of an air knife. The linear speed of the quenched tape was of from 6 to 8 m/min (S$_e$).

The tape was then heated to a temperature of from 110 to 115° C. on oil heated rolls stretching the tape in machine direction with ratios of from 6:1 to 9.5:1.

The tape was then transferred to a tenter frame oven having four heating zones in which the temperature was of from 115 to 130° C. and then, in examples 1, 3, 4, 5, in a stretching zone heated to temperatures of from 115° C. to 127° C., with stretching ratios of from 5.8:1 to 6.1:1 and finally in a relaxation zone heated to a temperature of from 80 to 85° C.

In example 2, 2 stretching zones and no relaxation zone were used.

Finally the film was cooled and wound onto a roll at a speed of from 30 to 50 m/min. (S$_c$).

The multilayer bioriented films obtained in this way have a thickness of 15 microns.

The ratio between layers 1, 2 and 3 was 1:2:1, respectively.

The process conditions (PC) of Examples 1–5 and the physical properties (FA) of the films manufactured are shown in Table A below.

COMPARATIVE EXAMPLE 1

By way of a comparison, with the film-forming compositions of Examples 1–5 a three-layer bioriented film was manufactured by the air bubble technique, proceeding as described hereinunder.

The film-forming compositions were coextruded in the form of a tube.

After quenching and solidification, the extruded tube was heated and inflated into a bubble by applying an internal air pressure and thus transforming the narrow, thick-walled tube into a wide, thin-walled tube.

After this stretching step, the tubular film was cooled and collapsed into a superimposed lay-flat tape and wound onto cylinders.

The air bubble process orients the film by stretching it simultaneously both longitudinally and transversely, thus imparting shrinkability.

The comparison film obtained in the best working conditions known to the inventors had a thickness of 15 microns and will be denoted hereinbelow by the code C-1.

The physical properties (FA) of the film C-1 and the working conditions of its manufacturing process (PC) are shown in Tables A–F below in comparison with those of films of the present invention.

EXAMPLES 6–9

The film-forming composition of examples 1–5 was used, changing the stretching conditions as shown in Table B which also shows the properties of the films obtained in this way.

EXAMPLES 10–12

The film-forming composition of examples 1–5 was used, changing the stretching conditions as shown in Table C which also shows the properties of the films obtained in this way.

More particularly the MD and TD shrinkage values, which may differ one from the other within a wide range, are worthy of note.

EXAMPLES 13–14

The film-forming composition of examples 1–5 was used, changing the stretching conditions as shown in Table D which also shows the properties of the films obtained in this way.

More particularly, the chain configuration for TD orientation was modified as follows:

in Example 13, 4 zones of the tenter frame oven have been devoted to preheating, 2 zones to stretching and no zone to relaxation;

in Example 14, 1 zone of the tenter frame oven has been devoted to preheating, 2 zones to stretching and 3 zones to relaxation.

The data in Table D clearly show that, by increasing the number of zones of relaxation, the TD shrink tension can be reduced without affecting the high shrinkage values.

EXAMPLES 15–16

The film-forming composition of examples 1–5 was used, changing the stretching conditions as shown in Table E which also shows the properties of the films obtained in this way.

The data in Table E show that lower shrink tension values can be obtained, especially in TD.

EXAMPLE 17

The film-forming composition of examples 1–5 was used, increasing the manufacturing line speed to reduce the thickness of the film to 10 microns and also changing the stretching conditions as shown in Table F which also shows the properties of the films obtained in this way compared with the film C-1 which is 15 microns thick.

The data in Table F show that, in spite of the smaller thickness, the film of the present invention has greater shrinkage values.

EXAMPLES 18–20

The film-forming composition of examples 1–5 was used, changing the stretching conditions as indicated in Table G which also reports the properties of the thus obtained films. In examples 19 and 20 the manufacturing line speed was also increased to reduce the thickness of the films to 12 and 10 microns respectively. The same configuration of the tenter frame oven has been employed in these three examples: 2 preheating zones, 2 stretching zones and 2 relaxation zones.

The physical properties (FA) of the films and the working conditions of their manufacturing process (PC) are shown in Table G.

EXAMPLES 21–23

The following film-forming compositions were used.
Film-forming composition of the core layer 2 (FIG. 1):
  100% of an ethylene/octene-1 copolymer which contains 10% octene-1 (NMR determination) and has a density of 0.920 g/cm$^3$ and three melting points at 106 ±2; 119 ±2 and 122 ±2° C.
Film-forming composition of the skin layers 1 and 3 (FIG. 1):
  87.5%, by weight, of a propylene/ethylene copolymer which contains 3.5% ethylene and has a density of of 0.900 g/cm$^3$ and a single melting point at 135.9 ±2° C.;
  12.1%, by weight, of polypropylene having a density of 0.904 g/cm$^3$ and a single melting point at 160 ±2° C.;
  0.4% of slip and anti-block agents.
Note: the abovementioned blend of layers 1 and 3 has one melting point at 128 ±2° C.

The procedure of Examples 1–5 was used, changing the stretching conditions as shown in Table H which also shows the properties of the films obtained in this way, together with those of the comparison film C-2 (see comparative example 2 below).

The ratio between layers 1, 2 and 3 was 1:3:1, respectively.

The data of Table H show that the working conditions of the manufacturing process of the invention may change within very wide ranges.

COMPARATIVE EXAMPLE 2

By way of a comparison, with the film-forming compositions of Examples 21–23, a three-layer bioriented film was manufactured with the air bubble technique, working under the best conditions known to the inventors. The film manufactured in this way had a thickness of 15 microns and is denoted hereinunder by the code C-2. The physical properties (FA) of the film C-2 and the working conditions of its manufacturing process (PC) are shown in Table H in comparison with those of the films of Examples 21–23 of the invention.

EXAMPLE 24

The following film-forming compositions have been used:
Film-forming composition of the core layer 2 (FIG. 1):
  as indicated for the core layer of examples 21–23;
Film-forming composition of the skin layers 1 and 3 (FIG. 1):
  87.5%, by weight, of a propylene-ethylene-butene-1 terpolymer containing 94% propylene, 4% ethylene and 2% butene-1, m.p. 130 ±2° C.;
  12.1%, by weight, of polypropylene having a density of 0.904 g/cm$^3$ and m.p. 160 ±2° C.;
  0.4% of slip and anti-block agents.
The ratio between layers 1, 2 and 3 was 2:11:2 respectively.

The same general process described in examples 1–5 was used, changing however the stretching conditions as indicated in Table I which also reports the properties of the films thus obtained.

EXAMPLE 25

The following film-forming compositions have been used:
Film-forming composition of the core layer 2 (FIG. 1):
  as indicated for the core layer of examples 21–23;
Film-forming composition of the skin layers 1 and 3 (FIG. 1):
  87.5%, by weight, of a propylene-ethylene-butene-1 terpolymer containing 91% propylene, 2% ethylene and 7% butene-1, m.p. 126 ±2° C.;
  12.1%, by weight, of polypropylene having a density of 0.904 g/cm$^3$ and m.p. 160 ±2° C.;
  0.4% of slip and anti-block agents.
The ratio between layers 1, 2 and 3 was 2:11:2 respectively.

The same general process described in examples 1–5 was used, changing however the stretching conditions as indicated in Table I which also reports the properties of the films thus obtained.

EXAMPLE 26

The following 5-ply barrier film was prepared by following the general process of examples 1–5 but using the film forming compositions indicated below:

Film-forming composition of the core layer 2 (FIG. 2):
- 80%, by weight, of an ethylene-vinyl alcohol copolymer containing 44% ethylene;
- 20%, by weight, of a caprolactam/laurolactam copolymer with m.p. 128–132° C.;

Film-forming composition of the skin layers 1 and 3 (FIG. 2):
- the same blend used for the skin layers 1 and 3 in examples 1–5;

Film-forming composition of the intermediate layers (tie layers) on both sides of the core layer 4 and 5 (FIG. 2):
- maleic anhydride grafted ethylene-butene copolymer containing 6% by weight of butene.

The ratio between the five layers was 2:2:1:2:2.
The line speed was adjusted to get a film 25 microns thick.
The stretching ratios, the stretching conditions and the properties of the thus obtained film are reported in Table I.

TABLE A

| | Films of the Examples | | | | | |
|---|---|---|---|---|---|---|
| PC | 1 | 2 | 3 | 4 | 5 | C-1 |
| $L_r$ | 6:1 | 6:1 | 6:1 | 8:1 | 9.5:1 | 5:1 |
| $T_p$ (° C.) | 115 | 115 | 115 | 110 | 110 | — |
| $T_l$ (° C.) | 115 | 90 | 110 | 115 | 115 | 115 |
| $C_r$ | 6:1 | 6:1 | 6:1 | 5.7:1 | 5.8:1 | 5:1 |
| $T_{cp}$ (° C.) | 115 | 115 | 115 | 127 | 127 | — |
| $T_{cs}$ (° C.) | 115 | 115-80 | 115 | 127 | 127 | 115 |
| Tcr (° C.) | 80 | — | 80 | 85 | 85 | — |

| FA | MD | TD | MD | TD | MD | TD | MD | TD | MD | TD | MD | TD |
|---|---|---|---|---|---|---|---|---|---|---|---|---|
| ST kg/cm² | 17.8 | 35.5 | 21.9 | 39.7 | 29.4 | 38.0 | 37 | 21 | 44 | 19 | 22.4 | 27.3 |
| S% 120 (° C.) | 58 | 73 | 64 | 66 | 65 | 67 | 67 | 57 | 66 | 56 | 60 | 64 |
| H | 3.6 | | 2.2 | | 1.7 | | — | — | — | — | 2.4 | |
| G | 132 | | 139 | | 142 | | — | — | — | — | 137 | |
| M Kg/cm² | 4279 | 5400 | 4221 | 5048 | 4644 | 5766 | — | — | — | — | 3558 | 3457 |
| TS Kg/cm² | 1015 | 946 | 1356 | 1302 | 1494 | 1337 | — | — | — | — | 1194 | 1114 |
| E | 103 | 136 | 112 | 102 | 101 | 117 | — | — | — | — | 100 | 110 |
| Average thickness μ | 14.1 | | 15.2 | | 14.9 | | 15.8 | | 16.0 | | 15.0 | |
| TTV μ | ±1 | | ±1 | | ±1.1 | | ±0.9 | | ±1.6 | | ±3 | |
| PTV sag mm | 25 | | 20 | | 22 | | — | | — | | 35 | |
| snaking mm | 15 | | 20 | | 22 | | — | | — | | 51 | |

TABLE B

| | Films of the Examples | | | | |
|---|---|---|---|---|---|
| PC | 6 | 7 | 8 | 9 | C-1 |
| $L_r$ | 6:1 | 6:1 | 6:1 | 6:1 | 5:1 |
| $T_p$ (° C.) | 115 | 115 | 115 | 100 | — |
| $T_l$ (° C.) | 115 | 115 | 90 | 95 | 115 |
| $C_r$ | 6:1 | 6:1 | 6:1 | 7.3:1 | 5:1 |
| $T_{cp}$ (° C.) | 115 | 117 | 116 | 130 | — |
| $T_{cs}$ (° C.) | 115 | 115 | 115 | 125-95 | 115 |
| Tcr (° C.) | 80 | 115-80 | 115-80 | 85 | — |

| FA | MD | TD | MD | TD | MD | TD | MD | TD | MD | TD |
|---|---|---|---|---|---|---|---|---|---|---|

TABLE B-continued

| | | | | | | | | | | |
|---|---|---|---|---|---|---|---|---|---|---|
| ST Kg/cm$^2$ | 17.7 | 35 | 20.4 | 24.4 | 13.9 | 33.8 | 10 | 37 | 22.4 | 27.3 |
| S% 120 (° C.) | 58 | 73 | 62 | 66 | 61 | 68 | 56 | 63 | 60 | 64 |
| H | | 2.5 | | 2.2 | | 1.7 | — | — | | 2.4 |
| G | | 137 | | 138 | | 144 | — | — | | 137 |
| M Kg/cm$^2$ | 5068 | 5409 | 5056 | 5917 | 4462 | 5816 | — | — | 3558 | 3457 |
| TS Kg/cm$^2$ | 914 | 116 | 1216 | 1125 | 1160 | 1661 | — | — | 1194 | 1114 |
| E | 110 | | 110 | | 125 | 85 | — | — | 100 | 110 |
| Average thickness μ | | 14.8 | | 15.1 | | 15.0 | | 14.9 | | 15.0 |
| TTV μ | | ±1 | | ±1.4 | | ±0.8 | | ±0.9 | | ±3 |
| PTV sag mm | | 23 | | 21 | | — | | — | | 35 |
| snaking mm | | 20 | | 28 | | — | | — | | 51 |

TABLE C

Films of the Examples

| PC | 10 | | 11 | | 12 | | C-1 | |
|---|---|---|---|---|---|---|---|---|
| L$_r$ | 4.5:1 | | 4.5:1 | | 4.5:1 | | 5:1 | |
| T$_p$ (° C.) | 100 | | 100 | | 100 | | — | |
| T$_l$ (° C.) | 85 | | 95 | | 95 | | 115 | |
| C$_r$ | 6.2:1 | | 6.2:1 | | 5:1 | | 5:1 | |
| T$_{cp}$ (° C.) | 134 | | 134 | | 130 | | — | |
| T$_{cs}$ (° C.) | 115-95 | | 115-95 | | 115-105 | | 115 | |
| Tcr (° C.) | 95 | | 85 | | 95 | | — | |

| FA | MD | TD | MD | TD | MD | TD | MD | TD |
|---|---|---|---|---|---|---|---|---|
| ST Kg/cm$^2$ | 7.1 | 6.1 | 9.4 | 9.3 | 14.3 | 7.5 | 22.4 | 27.3 |
| S% 120 (° C.) | 20 | 52 | 20 | 56 | 38 | 52 | 60 | 64 |
| H | | 6.1 | | 7.1 | | 6.4 | | 2.4 |
| G | | 122 | | 119 | | 119 | | 137 |
| M Kg/cm$^2$ | 2847 | 3539 | 3117 | 3575 | 3255 | 3675 | 3558 | 3457 |
| TS Kg/cm$^2$ | 475 | 377 | 536 | 381 | 1117 | 516 | 1194 | 1114 |
| E | 270 | 176 | 263 | 120 | 165 | 155 | 100 | 110 |
| Average thickness μ | | 16.0 | | 15.3 | | 14.8 | | 15.0 |
| TTV μ | | ±1.1 | | ±1.4 | | ±0.8 | | ±3 |
| PTV sag mm | | — | | — | | — | | 35 |
| snaking mm | | — | | — | | — | | 51 |

TABLE D

Films of the Examples

| PC | 13 | | 14 | | C-1 | |
|---|---|---|---|---|---|---|
| L$_r$ | 6.1 | | 6.1 | | 5:1 | |
| T$_p$ (° C.) | 115 | | 115 | | — | |
| T$_l$ (° C.) | 90 | | 115 | | 115 | |
| C$_r$ | 6:1 | | 6:1 | | 5:1 | |
| T$_{cp}$ (° C.) | 115 | | 117 | | — | |
| T$_{cs}$ (° C.) | 115-80 | | 115 | | 115 | |
| Tcr (° C.) | | | 115-85 | | — | |

| FA | MD | TD | MD | TD | MD | TD |
|---|---|---|---|---|---|---|
| ST Kg/cm$^2$ | 15.8 | 54.7 | 15.0 | 27.8 | 22.4 | 27.3 |
| S% 120 (° C.) | 58 | 68 | 56 | 68 | 60 | 64 |
| H | | 1.7 | | 1.8 | | 2.4 |
| G | | 143 | | 140 | | 137 |
| M Kg/cm$^2$ | 6039 | 4632 | 4945 | 5716 | 3558 | 3457 |
| TS Kg/cm$^2$ | 1273 | 2011 | 1110 | 1508 | 1194 | 1114 |
| E | 140 | 63 | 123 | 87 | 100 | 110 |
| Average thickness μ | | 15.1 | | 14.3 | | 15.0 |
| TTV μ | | ±1.2 | | +0.8 | | ±3 |
| PTV sag mm | | 18 | | 25 | | 35 |
| snaking mm | | 20 | | 23 | | 51 |

TABLE E

Films of the Examples

| PC | 15 | | 16 | | C-1 | |
|---|---|---|---|---|---|---|
| L$_r$ | 6.1 | | 6.1 | | 5:1 | |
| T$_p$ (° C.) | 100 | | 100 | | — | |
| T$_l$ (° C.) | 95 | | 85 | | 115 | |
| C$_r$ | 5:1 | | 5:1 | | 5:1 | |
| T$_{cp}$ (° C.) | 134 | | 134 | | — | |
| T$_{cs}$ (° C.) | 115-105 | | 115-95 | | 115 | |
| Tcr (° C.) | 95 | | 85 | | — | |

| FA | MD | TD | MD | TD | MD | TD |
|---|---|---|---|---|---|---|
| ST Kg/cm$^2$ | 14.7 | 2.3 | 13.9 | 3.5 | 22.4 | 27.3 |
| S% 120 (° C.) | 44 | 47 | 36 | 46 | 60 | 64 |
| H | | 10.3 | | 12 | | 2.4 |
| G | | 104 | | 98 | | 137 |
| M Kg/cm$^2$ | 3761 | 4194 | 3509 | 3738 | 3558 | 3457 |
| TS Kg/cm$^2$ | 1378 | 442 | 1411 | 419 | 1194 | 1114 |
| E | 122 | 240 | 117 | 268 | 100 | 110 |
| Average thickness μ | | 14.1 | | 15.6 | | 15.0 |
| TTV μ | | ±0.8 | | ±1.5 | | ±3 |
| PTV sag mm | | — | | — | | 35 |
| snaking mm | | — | | — | | 51 |

TABLE F

Films of the Examples

| PC | 17 | | C-1 | |
|---|---|---|---|---|
| L$_r$ | 6.1 | | 5:1 | |
| T$_p$ (° C.) | 115 | | — | |
| T$_l$ (° C.) | 115 | | 115 | |
| C$_r$ | 6:1 | | 5:1 | |
| T$_{cp}$ (° C.) | 115 | | — | |
| T$_{cs}$ (° C.) | 115 | | 115 | |
| Tcr (° C.) | 80 | | — | |

| FA | MD | TD | MD | TD |
|---|---|---|---|---|
| ST Kg/cm$^2$ | 30.5 | 34.0 | 22.4 | 27.3 |
| S% 120 (° C.) | 67 | 69 | 60 | 64 |
| H | | 1.2 | | 2.4 |
| G | | 15 | | 137 |
| M Kg/cm$^2$ | 4896 | 5342 | 3558 | 3457 |
| TS Kg/cm$^2$ | 1503 | 1287 | 1194 | 1114 |
| E | 86 | 112 | 100 | 110 |
| Average thickness μ | | 10.1 | | 15.0 |
| TTV μ | | ±0.8 | | ±3 |
| PTV sag mm | | — | | 35 |
| snaking mm | | — | | 51 |

TABLE G

| | Films of the Examples | | | | | |
|---|---|---|---|---|---|---|
| PC | 18 | | 19 | | 20 | |
| $L_r$ | 5.5:1 | | 5.5:1 | | 5.5:1 | |
| $T_p$ (° C.) | 110 | | 110 | | 110 | |
| $T_l$ (° C.) | 90 | | 90 | | 90 | |
| $C_r$ | 8.5:1 | | 8.5:1 | | 8.5:1 | |
| $T_{cp}$ (° C.) | 130 | | 130 | | 130 | |
| $T_{cs}$ (° C.) | 118 | | 118 | | 118 | |
| Tcr (° C.) | 90 | | 90 | | 90 | |
| FA | MD | TD | MD | TD | MD | TD |
| ST Kg/cm² | — | — | — | — | — | — |
| S% 120 (° C.) | 51 | 56 | 51 | 55 | 45 | 49 |
| H | 3.4 | | 3.8 | | 4.2 | |
| G | 128 | | 127 | | 118 | |
| M Kg/cm² | 4780 | 6990 | 5220 | 7800 | 5100 | 7800 |
| TS Kg/cm² | 1103 | 1290 | 1180 | 1420 | 1240 | 1190 |
| E | 109 | 65 | 100 | 67 | 84 | 70 |
| Average thickness μ | 15.1 | | 12.3 | | 9.9 | |
| TTV μ | ±1.0 | | ±0.9 | | ±0.7 | |
| PTV sag mm | 23 | | 18 | | 21 | |
| snaking mm | 20 | | 16 | | 18 | |

TABLE H

| | Films of the Examples | | | | | | | |
|---|---|---|---|---|---|---|---|---|
| PC | 21 | | 22 | | 23 | | C-2 | |
| $L_r$ | 5:1 | | 7:1 | | 6:1 | | 5:1 | |
| $T_p$ (° C.) | 100 | | 100 | | 100 | | — | |
| $T_l$ (° C.) | 90 | | 90 | | 90 | | 115 | |
| $C_r$ | 5:1 | | 7:1 | | 8.4:1 | | 5:1 | |
| $T_{cp}$ (° C.) | 148 | | 148 | | 162 | | — | |
| $T_{cs}$ (° C.) | 130 | | 130 | | 130 | | 115 | |
| Tcr (° C.) | 110 | | 110 | | 110 | | — | |
| FA | MD | TD | MD | TD | MD | TD | MD | TD |
| ST Kg/cm² | 9.7 | 20 | 11.6 | 32 | 11.4 | 20.7 | 17.4 | 28.2 |
| S% 120 (° C.) | 32 | 43 | 32 | 41 | 29 | 37 | 43 | 56 |
| H | 8.1 | | 9.5 | | 7.3 | | 1.9 | |
| G | 102 | | 122 | | 130 | | 138 | |
| M Kg/cm² | 5260 | 7257 | 7662 | 11516 | 6930 | 9629 | 8000 | 8083 |
| TS Kg/cm² | 610 | 744 | 868 | 1126 | 803 | 1023 | 919 | 993 |
| E | 107 | 41 | 84 | 34 | 89 | 47 | 108 | 91 |
| Average thickness μ | 15.5 | | 15.9 | | 16.1 | | 15.0 | |
| TTV μ | ±1.2 | | ±1.4 | | ±1.5 | | ±3 | |
| PTV sag mm | 24 | | 25 | | 23 | | 35 | |
| snaking mm | 28 | | 25 | | 20 | | 54 | |

TABLE I

| | Films of the Examples | | | | | |
|---|---|---|---|---|---|---|
| PC | 24 | | 25 | | 26 | |
| $L_r$ | 6.5:1 | | 6.5:1 | | 2.4:1 | |
| $T_p$ (° C.) | 115 | | 115 | | 110 | |
| $T_l$ (° C.) | 110 | | 100 | | 90 | |
| $C_r$ | 6.5:1 | | 6.5:1 | | 4.5:1 | |
| $T_{cp}$ (° C.) | 145 | | 140 | | 118 | |
| $T_{cs}$ (° C.) | 120 | | 111 | | 115 | |
| Tcr (° C.) | 95-80 | | 88-70 | | 110 | |
| FA | MD | TD | MD | TD | MD | TD |
| ST Kg/cm² | — | — | — | — | — | — |
| S% 120 (° C.) | 31 | 44 | 35 | 52 | 24 | 56 |
| H | 4.0 | | 1.7 | | 3.4 | |
| G | 123 | | 122 | | 128 | |
| M Kg/cm² | 4700 | 5600 | 6031 | 7245 | 6629 | 7496 |
| TS Kg/cm² | 580 | 490 | 927 | 540 | 600 | 850 |
| E | 90 | 60 | 87 | 54 | 209 | 92 |
| Average thickness μ | 15.3 | | 15.8 | | 25.3 | |
| TTV μ | ±0.9 | | ±1.1 | | ±1.1 | |
| PTV sag mm | 18 | | — | | 24 | |
| snaking mm | 19 | | — | | 20 | |

What is claimed is:

1. A multilayer, biaxially oriented, heat shrinkable thermoplastic film comprising:
   a) a core layer comprising
      i) between 50 and 100 parts, by weight of the layer, of an ethylene/alpha-olefin $C_4$–$C_{12}$ copolymer, and
      ii) between 0 and 50 parts, by weight of the layer, of a polymer selected from the group consisting of polyolefin, and modified polyolefin,
   the layer having more than one melting point when detected by differential scanning calorimetry according to ASTM D-3418; and
   b) two outside layers each comprising a polymer selected from group consisting of ethylene/alpha-olefin $C_4$–$C_{12}$ copolymer, ethylene/vinyl acetate copolymer, ethylene/acrylate copolymer, propylene homopolymer, propylene copolymer, modified polyolefin, and mixtures thereof;
   wherein the total thickness variation in said multilayer film is lower than ±10% according to ASTM D 374-88;
   and wherein the film is made by a tenter frame process.

2. A multilayer film according to claim 1 wherein the total thickness variation is lower than ±5%.

3. A multilayer film according to claim 1 wherein the film is oriented at a stretching ratio of between 2:1 and 11:1 in the machine direction, and between 3:1 and 12:1 in the transverse direction.

4. A multilayer film according to claim 1 wherein the polyolefin of the core layer is selected from the group consisting of ethylene/vinyl acetate copolymer, ethylene/acrylate copolymer, propylene homopolymer, and propylene copolymer.

5. A multilayer film according to claim 1 wherein the amount of alpha-olefin in the ethylene/alpha-olefin $C_4$–$C_{12}$ copolymer of the core layer is at least 7% by weight of the copolymer.

6. A multilayer film according to claim 1 wherein the alpha-olefin of the core layer is 1-octene.

7. A multilayer film according to claim 1 wherein the film is cross-linked.

8. A multilayer film according to claim 1 wherein the two outside layers each comprise
   a) between 40 and 60%, by weight of the outside layer, of a first ethylene/ alpha-olefin $C_4$–$C_{12}$ copolymer,
   b) between about 20 and 30%, by weight of the outside layer, of a second ethylene/alpha-olefin $C_4$–$C_{12}$ copolymer, and
   c) between 20 and 30%, by weight of the outside layer, of an ethylene/vinyl acetate copolymer.

9. A multilayer film according to claim 8, wherein the first ethylene/alpha-olefin $C_4$–$C_{12}$ copolymer is an ethylene/octene-1 copolymer.

10. A multilayer film according to claim 8, wherein the second ethylene/alpha-olefin $C_4$–$C_{12}$ copolymer is an ethylene/octene-1 copolymer.

11. A multilayer film according to claim 10, wherein the second ethylene/octene-1 copolymer contains from 2.5 to 4.5%, by weight of the copolymer, of octene-1.

12. A multilayer film according to claim 1, wherein the two outside layers each comprise:
   a) between 75 and 100%, by weight of the outside layer, of a propylene copolymer, and
   b) between 0 and 25%, by weight of the outside layer, of a polypropylene homopolymer.

13. A multilayer, biaxially oriented, heat shrinkable thermoplastic film comprising:
   a) a core layer comprising an oxygen barrier material;
   b) two intermediate layers each comprising a modified polyolefin; and
   c) two outside layers each comprising
      i) between 50 and 100 parts, by weight of each layer, of an ethylene/alpha-olefin $C_4$–$C_{12}$ copolymer, and
      ii) between 0 and 50 parts, by weight of each layer, of a polymer selected from the group consisting of polyolefin, and modified polyolefin,
      each layer having more than one melting point when detected by differential scanning calorimetry according to ASTM D-3418;

wherein the total thickness variation in said multilayer film is lower than ±10% according to ASTM D 374-88;

and wherein the film is made by a tenter frame process.

* * * * *